US006865164B1

(12) United States Patent
Scribano et al.

(10) Patent No.: US 6,865,164 B1
(45) Date of Patent: Mar. 8, 2005

(54) PACKET TRANSMISSION METHOD

(75) Inventors: Gino Anthony Scribano, Saint Charles, IL (US); Robert T. Love, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 696 days.

(21) Appl. No.: 09/657,915

(22) Filed: Sep. 8, 2000

Related U.S. Application Data

(60) Provisional application No. 60/152,741, filed on Sep. 8, 1999.

(51) Int. Cl.$^7$ ................................................. H04Q 7/00
(52) U.S. Cl. ....................... 370/328; 370/332; 370/392; 370/395.1; 370/349; 455/561; 455/422.1; 455/424; 455/442; 455/445
(58) Field of Search ................................. 370/328, 332, 370/349, 392, 395.1; 455/422.1, 424, 442, 445, 561

(56) References Cited

U.S. PATENT DOCUMENTS

| | | | |
|---|---|---|---|
| 4,910,794 A | | 3/1990 | Mahany |
| 5,469,471 A | | 11/1995 | Wheatley, III |
| 5,493,563 A | | 2/1996 | Rozanski et al. |
| 5,615,210 A | | 3/1997 | Kaiyama et al. |
| 5,671,219 A | * | 9/1997 | Jensen et al. ................ 370/280 |
| 6,049,535 A | | 4/2000 | Ozukturk et al. |
| 6,128,316 A | * | 10/2000 | Takeda et al. ............... 370/468 |
| 6,154,450 A | * | 11/2000 | Wallentin et al. ............ 370/311 |
| 6,161,013 A | * | 12/2000 | Anderson et al. ............ 455/437 |
| 6,341,124 B1 | * | 1/2002 | Johansson et al. ........... 370/335 |
| 6,353,742 B1 | * | 3/2002 | Bach ........................... 455/453 |
| 6,389,034 B1 | * | 5/2002 | Guo et al. .................... 370/441 |
| 6,587,465 B1 | * | 7/2003 | Dempo ...................... 370/395.1 |
| 2002/0126664 A1 | * | 9/2002 | Kiiski et al. ................. 370/389 |

FOREIGN PATENT DOCUMENTS

WO     WO 200041431 A1 * 7/2000 ........... H04L/12/28

* cited by examiner

*Primary Examiner*—Alpus H. Hsu
*Assistant Examiner*—Clemence Han
(74) *Attorney, Agent, or Firm*—Randall S. Vaas; Steven A. May

(57) ABSTRACT

A wireless system includes base station transceivers (102–104) to communicate with at least one mobile station (108), the base station transceivers communicate with a network controller (110). The base station controls a header for a packet frame to be communicated between the base station transceiver and the network controller wherein a portion of the header identifies the frame as one containing no data package. The data bits of the header field may contain a predetermined bit pattern for a frame including no data package. Information received by the base station from the mobile station may be dropped, and the header information replaced with the specified bit pattern, if a decoding metric passes a threshold. The information received by the base station from the mobile station may be dropped, and the header information replaced with the specified bit pattern, if a CRC for the frame received from the mobile station fails.

5 Claims, 1 Drawing Sheet

| 7 | 6 | 5 | 4 | 3 | 2 | 1 | 0 | OCTET |
|---|---|---|---|---|---|---|---|---|
| FSN | | | | | | SFSN | | 1 |
| REVERSE LINK QUALITY | | | | | | | | 2 |
| SCALING | | PACKET ARRIVAL TIME ERROR | | | | | | 3 |
| FPC PRIMARY SUBCHANNEL:CLTGA | | | | | | | | 4 |
| FPC: SIGNAL TO THERMAL NOISE RATIO | | | | | | | EIB | 5 |
| LENGTH | | | | | | | | 6 |
| REVERSE LINK INFORMATION + LAYER 3 FILL | | | | | | | | VARIABLE |

PACKET TRANSMISSION METHOD

RELATED APPLICATION

This application claims priority from U.S. Provisional Application 60/152,741, filed on Sep. 8, 1999, entitled SUPPORT OF 3G POWER CONTROL, the disclosure of which is incorporated herein by reference thereto.

FIELD OF THE INVENTION

The present invention pertains to packet transmission, and more particularly to packet transmission between cellular base transceiver stations and network switches.

BACKGROUND OF THE INVENTION

Packets, or frames, communicated from the base transceiver stations (BTSs) and the Radio Network Controllers (RNCs) in a wireless cellular data communication system, such as a code division multiple access (CDMA) system, contain a header with control and quality information and a payload containing data. These communications are commonly referred to as backhaul. In these systems, the loading may include data, control messages, or other information relating to mobile station or base transceiver station operation. When data is not present, the data payload portion of the packet or frame may comprise fill bits. The RNC ignores these fill bits.

Backhaul loading can limit the overall system capacity. In many situations, backhaul loading is not a problem. However, as data demands rise, and capacity reaches its limits in existing systems, backhaul loading can limit system capacity. Accordingly, what is needed is a method of reducing loading without negatively impacting on communications.

DETAILED DESCRIPTION OF THE DRAWINGS

Figures 1, 2:
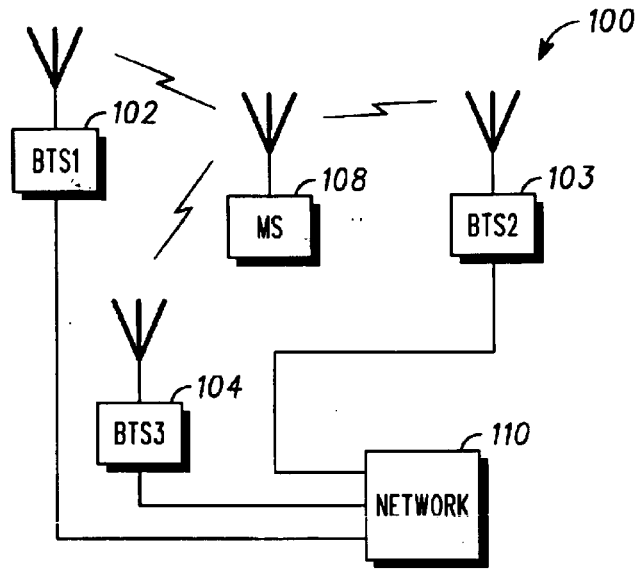
FIG. 1 is block diagram illustrating a cellular communication system.
FIG. 2 illustrates a frame or packet communicated between the base transceiver stations and the network in the communication system according to FIG. 1.

A wireless system includes base station transceivers to communicate with at least one mobile station, the base station transceivers communicate with a network controller. The base station controls a header for a packet frame to be communicated between the base station transceiver and the network controller wherein a portion of the header identifies the frame as one containing no data package. The data bits of the header field may contain a predetermined bit pattern for a frame including no data package. Information received by the base station from the mobile station may be dropped, and the header information replaced with the specified bit pattern, if a decoding metric passes a threshold. The information received by the base station from the mobile station may be dropped, and the header information replaced with the specified bit pattern, if a CRC for the frame received from the mobile station fails.

A cellular system 100 is disclosed in FIG. 1. The illustrated cellular system 100 is a code division multiple access system including a plurality of base transceiver stations (BTS) 102–104 in communication with a mobile station MS 108 that communicate over respective wireless communication paths. Those skilled in the art will recognize that typically more than three base transceiver and more than one mobile station will be present in a system. The base transmission stations 102–103 are connected to a mobile switching system network 110. The infrastructure (network controller) responsible for controlling, coordinating, and initializing base transceiver stations, is commonly known as the central base station controller (CBSC), or radio network controller (RNC), or the selection/distribution unit (SDU). Digital cellular systems of this type are well known. During normal operation, backhaul communications are made between the BTS and network controller both for system control and outgoing communications.

For packet, circuit, or voice data it is not necessary to transmit the packet payload from the BTS to the RNC when the BTS demodulator is not decoding a signal from the MS. It is envisioned that a bit or unassigned bit pattern is added to a header in the packet 200 (FIG. 2). Preferably, an existing bit field in the header for communications between the base transceiver station and the network controller to indicate that the data payload is empty. Although any header can be used, the bits in the header that would have been used for signal error rate (SER), such as the "Signal to Thermal Noise Ratio" octet in packet 200. When a data payload ("Reverse Link Information") is present, this field is used to indicate signal quality. If a payload is not present, the field can be advantageously employed to transmit a predetermined bit pattern (or one bit of the octet can be a flag) indicating that a payload is not present.

In operation, the BTSs 102–104 insert the predetermined bit, or pattern, into the selected field when transmitting a signal to the RNC 110. The RNC checks to see if the predetermined pattern, or flag bit, in the header indicate whether "Reverse Link Information", referred to herein as payload is present. If the payload is present, it is processed in the ordinary manner. If a payload is not present, the frame is processed in the same manner as if the payload was all fill bits.

Those skilled in the art will recognize that the cyclic redundancy check (CRC), which is in the data payload, may not be present if the data payload is removed from the packet, or frame. It is envisioned that a CRC can be provided for the header, or the payload CRC can be used. If the payload CRC is used where the payload is dropped, it will be calculated only over the header.

Thus it can be seen that a bit pattern of the frame type bit field of the packet header can be selected to indicate that a payload is not attached. Alternately a new field can be used in the packet header.

The invention can be advantageously employed to more efficiently use the reverse backhaul bandwidth by not passing up filler data for frame intervals when none of the fingers allocated by a BTS to a given user are in lock. An example of where fill data is transmitted in existing systems is when none of the channel demodulators (fingers) corresponding to a given mobile station (or end user equipment) communication link are in "lock", which can happen to the weaker serving leg during soft handoff to a stronger serving leg. Normal operation at the base transceiver station (BTS) of a code division multiple access (CDMA) cellular system requires assigning fingers to the signal paths received at a serving base station in communication with a mobile station. Finger assignment is determined by a set of finger management rules applied to active (active meaning that fingers (demodulators) are currently assigned to the offset) pseudo noise (PN) offsets and potential PN offset candidates after each search time interval. PN offset candidates are determined by the searcher when the energy of a given signal path exceeds some search threshold. Active PN offsets have fingers assigned to them and are demodulated followed by soft combining and decoding.

When a fingers energy assigned to an active PN offset goes below a "lock" threshold, the finger is deassigned such that no demodulation takes place for that finger and it no longer is used in diversity combining. The deassigned finger can then be assigned to a more promising PN candidate if one exists. If the searcher does not detect any PN offsets with sufficient energy to report to the finger manager and the existing active (locked) fingers all fall out of lock because their respective energy falls below a lock threshold, then no demodulation can take place. At this point, the data passed up in the payload frame to the RNC is set to a predetermined patterned (e.g. all zeros).

Hence, there is no need to pass up the payload portion of a given frame interval when there is no finger lock as there are no valid bits decoded. Eliminating the unnecessary payload reduces backhaul bandwidth requirements (backhaul bandwidth refers to the required communications bandwidth between base transceiver stations and the infrastructure responsible for controlling, coordinating, and initializing base transceiver stations typically known as the CBSC, or RNC, or SDU). Therefore, inter-carrier soft handoff is provided herein which provides an indication for the situation where a header is returned to the RNC alone without a data payload.

This concept can be extended to the case when frames are erased (such as where CRC fails) at the BTS even though some fingers are still locked. The decision on whether to send a payload or an erased frame can be made a soft decision by using a threshold based on symbol error rate (SER), or some similar frame quality metric, as some erased frames still have useful information and the corresponding payload is needed at the RNC. Examples of quality frame metrics that can be used for the decision of whether to transmit the data include a total metric or a bit energy metric (BER) such as the estimated signal to interference ratio (SIR), signal to noise ratio (SNR) or Eb/Nt, or the like.

Thus it can be seen that a system is disclosed for assigning a new bit or using an unallocated bit pattern of an existing field in the packet header to indicate the absence of the data payload portion of the packet. This allows a reduction of the average backhaul bandwidth. This is particularly advantageous when none of the user allocated fingers are in lock at a given service base transceiver station (BTS), but can also be extended for erased frames with high SER at the discretion of the carrier/operator.

We claim:

1. For a wireless system including base station transceivers to communicate with at least one mobile station, the base station transceivers communication with a network controller, a method comprising the steps of:

determining whether to convey information received from a mobile station in a backhaul frame based on a decoding metric:

in response to determining to not convey the information in the frame, controlling, in a base station transceiver, a header for a packet frame to be communicated between the base station transceiver and the network controller wherein a portion of the header identifies the frame as one containing no data package; and transmitting the frame to the network controller with the constructed header and without the data package.

2. The method according to claim 1 wherein data bits of a header field contain a predetermined bit pattern for a frame including no data package.

3. The method according to claim 1 wherein the information received by the base station from the mobile station is dropped, and the header information is replaced with the specified bit pattern, if a decoding metric passes a threshold.

4. The method according to claim 1 wherein the information received by the base station from the mobile station is dropped and the header information is replaced with the specified bit pattern if a CRC for the frame received from the mobile station fails.

5. The method according to claim 1 wherein the decoding metric comprises at least one of a finger lock status, a symbol error rate, a bit error rate, and signal-to-interference ratio, and a signal-to-noise ratio.

* * * * *